US009551321B2

(12) United States Patent
Gerber et al.

(10) Patent No.: US 9,551,321 B2
(45) Date of Patent: Jan. 24, 2017

(54) SYSTEM AND METHOD FOR CONTROLLING A WIND TURBINE

(71) Applicant: General Electric Company, Schenectady, NY (US)

(72) Inventors: Brandon Shane Gerber, Charleston, SC (US); Thomas Franklin Perley, Simpsonville, SC (US); Rahul Rastogi, Greenville, SC (US)

(73) Assignee: General Electric Company, Schenectady, NY (US)

( * ) Notice: Subject to any disclaimer, the term of this patent is extended or adjusted under 35 U.S.C. 154(b) by 754 days.

(21) Appl. No.: 13/927,202

(22) Filed: Jun. 26, 2013

(65) Prior Publication Data

US 2015/0005966 A1 Jan. 1, 2015

(51) Int. Cl.
*F03D 7/02* (2006.01)
*F03D 7/04* (2006.01)

(52) U.S. Cl.
CPC ............. *F03D 7/028* (2013.01); *F03D 7/02* (2013.01); *F03D 7/0292* (2013.01); *F03D 7/042* (2013.01);
(Continued)

(58) Field of Classification Search
CPC .......... F05B 2270/32; F05B 2270/1033; F05B 2270/326; F05B 2270/327; F05B 2270/328; F05B 2270/331; F05B 2270/332; F05B 2270/334; F05B 2270/335; F05B 2270/101; F05B 2270/20; F05B 2270/808; F05B 2270/80; F05B 2270/8042; F05B 2270/807; F05B 2260/821; F05B 2260/70; F05B 2240/912; F03D 7/00; F03D 7/0224; F03D 7/024; F03D 7/0264; F03D 7/0276; F03D 7/028; F03D 7/04; F03D 7/042; F03D 7/043; Y02E 10/721; Y02E 10/722; Y02E 10/723; G05B 13/021; G05B 13/0229; G01L 5/0019; H02P 2101/15
See application file for complete search history.

(56) References Cited

U.S. PATENT DOCUMENTS

| 4,435,647 | A | * | 3/1984 | Harner ............... F03D 7/0224 290/44 |
| 5,652,485 | A | | 7/1997 | Spiegel et al. |

(Continued)

FOREIGN PATENT DOCUMENTS

| EP | 1626175 A1 | 2/2006 |
| EP | 2056210 A2 | 5/2009 |

(Continued)

OTHER PUBLICATIONS

European Search Report and Opinion issued in connection with corresponding EP Application No. 14172571.3 on Dec. 4, 2014.
Related U.S. Appl. No. 13/847,084, filed Mar. 19, 2013.

*Primary Examiner* — Crystal J Barnes-Bullock
(74) *Attorney, Agent, or Firm* — Dority & Manning, P.A.

(57) ABSTRACT

Systems and methods for controlling a wind turbine are disclosed. The method includes: measuring a loading condition acting on the wind turbine; determining a first scaler factor based on the measured loading condition; determining a correction parameter for the wind turbine, the correction parameter a function of at least two measured operating conditions and representative of a real-time operational state of the wind turbine; determining a second scaler factor based on the correction parameter; calculating an adjustment set point based on the first scaler factor and the second scaler factor; and, controlling the wind turbine based on the adjustment set point.

19 Claims, 6 Drawing Sheets

(52) U.S. Cl.
CPC ........ *F05B 2260/74* (2013.01); *F05B 2270/32* (2013.01); *F05B 2270/328* (2013.01); *F05B 2270/331* (2013.01); *F05B 2270/335* (2013.01); *F05B 2270/808* (2013.01); *Y02E 10/723* (2013.01)

(56) References Cited

U.S. PATENT DOCUMENTS

| | | | |
|---|---|---|---|
| 6,320,272 B1* | 11/2001 | Lading | F03D 7/0224 290/44 |
| 6,888,262 B2 | 5/2005 | Blakemore | |
| 7,004,724 B2 | 2/2006 | Pierce et al. | |
| 7,476,985 B2 | 1/2009 | Llorente Gonzalez | |
| 7,573,149 B2 | 8/2009 | Kammer et al. | |
| 7,870,783 B2 | 1/2011 | Yoshida et al. | |
| 7,883,317 B2 | 2/2011 | Ormel et al. | |
| 7,895,016 B2* | 2/2011 | Vittal | F03D 11/0091 290/44 |
| 7,933,744 B2* | 4/2011 | Jammu | F03D 7/026 702/185 |
| 7,950,901 B2 | 5/2011 | Barbu et al. | |
| 7,964,979 B2* | 6/2011 | Miranda | F03D 7/0224 290/44 |
| 8,025,476 B2 | 9/2011 | Zheng et al. | |
| 8,033,788 B2* | 10/2011 | Egedal | F03D 7/0292 416/43 |
| 8,035,241 B2 | 10/2011 | Subramanian et al. | |
| 8,050,899 B2 | 11/2011 | Giguere et al. | |
| 8,093,737 B2 | 1/2012 | Wittekind et al. | |
| 8,128,361 B2* | 3/2012 | Dawson | F03D 7/0236 416/1 |
| 8,128,362 B2 | 3/2012 | Andersen et al. | |
| 8,202,048 B2* | 6/2012 | Stiesdal | F03D 7/0224 416/1 |
| 8,212,373 B2 | 7/2012 | Wittekind et al. | |
| 8,215,905 B2* | 7/2012 | Slack | F03D 11/0091 416/1 |
| 8,262,354 B2 | 9/2012 | Hoffmann | |
| 8,301,310 B2 | 10/2012 | Nim | |
| 8,328,514 B2 | 12/2012 | Viripullan et al. | |
| 8,360,722 B2 | 1/2013 | Hoffmann et al. | |
| 8,448,527 B2* | 5/2013 | Frere | F03D 1/0675 73/861.85 |
| 8,622,698 B2* | 1/2014 | Kristoffersen | F03D 7/0224 290/44 |
| 2006/0273595 A1 | 12/2006 | Avagliano et al. | |
| 2008/0195255 A1 | 8/2008 | Lutze et al. | |
| 2009/0099702 A1 | 4/2009 | Vyas et al. | |
| 2010/0241280 A1 | 9/2010 | Garcia Barace et al. | |
| 2010/0283245 A1 | 11/2010 | Gjerlov et al. | |
| 2010/0312594 A1 | 12/2010 | Andersen et al. | |
| 2011/0153096 A1 | 6/2011 | Pal et al. | |
| 2011/0221193 A1* | 9/2011 | Kalen | F03D 7/0212 290/44 |
| 2012/0078517 A1 | 3/2012 | Bogucki | |
| 2012/0086209 A1 | 4/2012 | Obrecht | |
| 2012/0133138 A1 | 5/2012 | Sorensen et al. | |
| 2012/0165996 A1 | 6/2012 | Olesen | |
| 2013/0156577 A1 | 6/2013 | Esbensen et al. | |
| 2014/0178197 A1* | 6/2014 | Risager | F03D 7/0224 416/1 |

FOREIGN PATENT DOCUMENTS

| | | |
|---|---|---|
| EP | 2325480 A1 | 5/2011 |
| EP | 2 444 659 A1 | 4/2012 |
| EP | 2778395 A2 | 9/2014 |
| WO | WO 2005/010358 A1 | 2/2005 |
| WO | WO 2010/069534 A1 | 6/2010 |
| WO | WO 2011/015383 A2 | 2/2011 |
| WO | WO 2011/076818 A2 | 6/2011 |
| WO | WO 2011/076875 A2 | 6/2011 |
| WO | WO 2011/101475 A2 | 8/2011 |
| WO | 2011157272 A2 | 12/2011 |
| WO | WO 2011/157271 A2 | 12/2011 |
| WO | WO 2011/160634 A1 | 12/2011 |
| WO | WO 2012/044161 A2 | 4/2012 |
| WO | WO 2012/103668 A1 | 8/2012 |
| WO | WO 2012/149984 A1 | 11/2012 |
| WO | WO 2013/000468 A1 | 1/2013 |

* cited by examiner

FIG. 8

SYSTEM AND METHOD FOR CONTROLLING A WIND TURBINE

FIELD OF THE INVENTION

The present invention relates generally to wind turbines, and more particularly, to systems and methods for controlling wind turbines.

BACKGROUND OF THE INVENTION

A wind turbine includes a rotor having multiple blades to transform wind energy into rotational torque that drives a generator, which is coupled to the rotor through a drive train and gearbox. The gearbox steps up the inherently low rotational speed of the rotor for the generator to efficiently convert the mechanical energy to electrical energy, which is fed to a utility grid.

Figure 1:
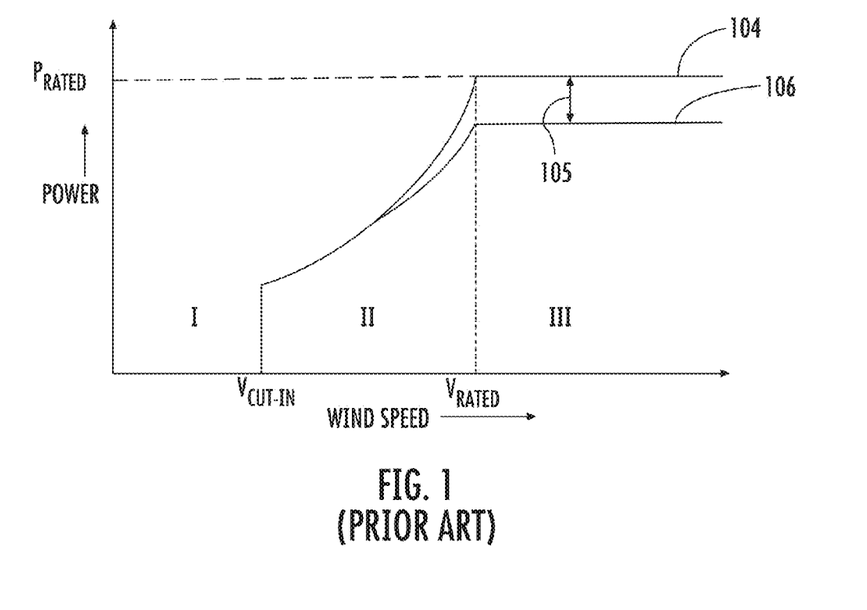
FIG. 1 illustrates a plurality of power curves of a wind turbine as a function of wind speed.
Figure 2:
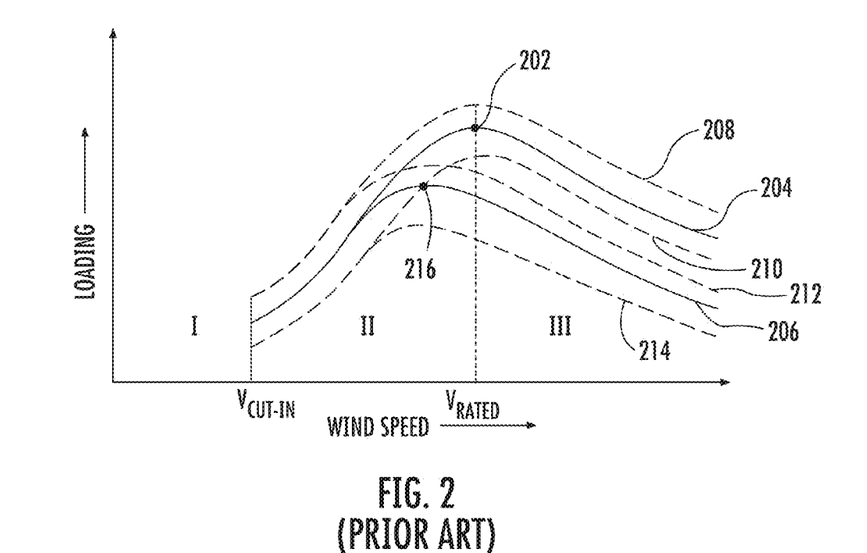
FIG. 2 illustrates a plurality of loading curves of a wind turbine as a function of wind speed.

The amount of power that may be produced by a wind turbine is typically limited by structural limitations (i.e. design loads) of the individual wind turbine components. Further, the loads experienced by the wind turbine may depend on a number of factors, including wind speed, wind peaks, wind turbulence, wind shear, changes in wind direction, density in the air, and similar. Referring to FIG. 1, modern utility-grade wind turbines are generally operated in accordance with a design power curve wherein in a first region (Region I), the wind speed is too low to warrant turbine operation and the turbine blades are pitched to a full feather position corresponding to the pitch angle that produces minimum aerodynamic torque. At a wind speed sufficient for start-up ($V_{cut-in}$), the blades are pitched to a Region II nominal pitch angle wherein a maximum aerodynamic lift is generated to produce torque and turn the rotor. In Region II, the wind speed and generator torque are below "rated", and blade pitch is generally held constant at an optimal angle to produce maximum aerodynamic power. With an increase in wind speed in Region II, power captured by the wind turbine increases along with mechanical loads on the turbine structure and components as illustrated in FIG. 2.

At "rated" wind speed ($V_{rated}$), the wind turbine reaches its rated power ($P_{rated}$) in Region III of the design power curve. In this region, the wind turbine power is limited to rated power to maintain the machine loads within design limits. Generator torque is held constant and blade pitch is controlled to regulate turbine speed at $V_{rated}$.

In turbulent wind conditions, wind turbines may experience mechanical loads higher than design loads. As such, conventional control strategies either shut down the wind turbine completely or implement a standard "de-rate" of rated power in an effort to maintain operation of the wind turbine without exceeding design loads. The term "de-rate" as used herein is understood to mean producing less power than the rated power during full load operation. For example, as shown in FIG. 1, curve 104 represents the design power curve, whereas curve 106 represents the de-rated power curve. Similarly, as shown in FIG. 2, curves 204 and 206 represent the corresponding loading curve and de-rated loading curve, respectively. As shown, the loading curve 204 increases from $V_{cut-in}$ to a maximum load 202 until the wind turbine reaches rated power, at which point the loading curve 204 begins to decrease. De-rated loading curve 206 follows a similar pattern, however, the maximum load 216 and all other loads represented by loading curve 206 are decreased by de-rating the rated power such that design loads are not exceeded. The dotted lines 208, 210, 212, 214 correspond to a +/− standard deviation of the loads acting on the wind turbine.

In other control strategies, the wind turbine power may also be "up-rated" when normal operation produces loads much lower than design loads. The term "up-rate" is understood to mean producing more than nominal power during full operation. Up-rating a wind turbine is advantageous under benign environmental conditions, when wind conditions are smooth, such that power output may be increased without overloading wind turbine components. It should be understood that "wind turbine component" is meant to encompass any portion of a wind turbine, including, but not limited to a rotor blade, a rotor, a hub, a pitch bearing, a yaw bearing, a bed plate, a main frame, a generator frame, a nacelle, a main shaft, a generator, a gearbox, or a tower of the wind turbine.

The previous control strategies described herein are effective at reducing loads acting on the wind turbine; however, they still involve certain disadvantages. For example, providing a flat de-rate or up-rate (with respect to wind speed) based on monitored loading conditions results in a loss of potential power production as indicated by gap 105 (FIG. 1). More specifically, an extreme gust or high turbulence condition may be detected over a short period of time, causing the control system to de-rate the wind turbine regardless of whether the wind conditions subsequently improve. As a result, current control strategies lose potential power output by not adjusting the initial de-rate in response to improved conditions or operation region.

Accordingly, an improved system and method for controlling a wind turbine would be welcomed in the technology. More specifically, a system and method for controlling a wind turbine that involves optimizing the power output while also maintaining loadings of individual wind turbine components below design loads would be advantageous.

BRIEF DESCRIPTION OF THE INVENTION

Aspects and advantages of the invention will be set forth in part in the following description, or may be obvious from the description, or may be learned through practice of the invention.

In one embodiment, a method for controlling a wind turbine is disclosed. The method includes: measuring a loading condition acting on the wind turbine using one or more sensors; determining a first scaler factor based on the measured loading condition; calculating a correction parameter for the wind turbine, the correction parameter a function of at least two measured operating conditions and representative of a real-time operational state of the wind turbine; determining a second scaler factor based on the correction parameter; determining an adjustment set point based on a common function of the first scaler factor and the second scaler factor; and, controlling the wind turbine based on the adjustment set point.

The one or more sensors may include one of or a combination of MIMU sensors, strain gauges, accelerometers, proximity sensors, pressure sensors, angle of attack sensors, vibration sensors, LIDAR sensors, camera systems, fiber optic system, or similar. The loading condition may reflect a load acting on one of or a combination of a rotor blade, a rotor, a hub, a nacelle, a main shaft, a generator, a tower, or any other wind turbine component. In one embodiment, one of the at least two operational conditions may be a pitch angle. In another embodiment, the at least two operational conditions may comprise one of a generator torque, a generator speed, or a power output. As such, in one embodiment, the correction parameter may be a function of a pitch angle of a rotor blade and a power output of the wind turbine.

In another embodiment, the step of determining the first scaler factor may further include: storing a plurality of loading conditions over a period of time; calculating one of a standard deviation, a weighted average, or a lag filter of the plurality of loading conditions; and, determining the first scaler factor based on the calculation. Additionally, the step of determining the correction parameter may further include: measuring a plurality of operating conditions of the wind turbine; storing the plurality of loading conditions; calculating a plurality of correction parameters, wherein each correction parameter may be a function of at least two of the measured operating conditions; calculating a weighted average of the plurality of correction parameters; and, determining a final correction parameter based on the weighted average of the plurality of correction parameters.

In yet another embodiment, the step of calculating the adjustment set point may further include: multiplying the first scaler factor by the second scaler factor. Further, the method may include adjusting the adjustment set point by a safety factor. In still further embodiments, the step of controlling the wind turbine may further include performing a corrective action. The corrective action may include de-rating or up-rating the wind turbine. In further embodiments, de-rating or up-rating the wind turbine may include altering a pitch angle of a rotor blade, modifying a generator torque, modifying a generator speed, modifying a power output, yawing a nacelle of the wind turbine, braking one or more wind turbine components, activating an airflow modifying element on a rotor blade, or any combination thereof.

In another embodiment, a system for controlling a wind turbine is disclosed. The system may include one or more sensors configured to monitor one or more loading conditions acting on the wind turbine; a processor communicatively coupled to the one or more sensors; and a controller. The processor may be configured to: determine a first scaler factor based on the one or more loading conditions; determine a correction parameter, wherein the correction parameter is a function of at least two measured operating conditions of the wind turbine and is representative of a real-time operational state of the wind turbine; calculate a second scaler factor based on the correction parameter; and determine an adjustment set point based on the first scaler factor and the second scaler factor. The controller may be communicatively coupled to the processor, wherein the controller controls the wind turbine based on the adjustment set point. In further embodiments, the controller may include a memory device configured to store any of the features described herein, such as the one or more loading conditions or the at least two operating conditions.

In yet another embodiment, the processor may be further configured to calculate a standard deviation, a weighted average, or a lag filter of the plurality of stored loading conditions. Further, the processor may be configured to determine the first scaler factor based on the calculation. In another embodiment, the processor may be configured to calculate a plurality of correction parameters based on the stored operating conditions. Further, the processor may calculate a weighted average of the plurality of correction parameters to determine a final correction parameter.

In still another embodiment, the processor may be configured to adjust the adjustment set point by a safety factor. In yet another embodiment, the controller may be configured to perform a corrective action as described herein on the wind turbine based on the adjustment set point. Further, the system may be configured in accordance with any one of the embodiments set forth above.

In another aspect of the invention, a method for optimizing a power output of a wind turbine under changing loading conditions is disclosed. The method includes: measuring at least one loading condition acting on the wind turbine; monitoring a power output of the wind turbine; modifying at least one operating condition of the wind turbine so as to keep the loading condition under a design load; and, incrementally increasing the power output of the wind turbine so long as the loading condition is less than the design load.

Still further aspects of the invention encompass a wind turbine having a tower, a nacelle mounted atop the tower, a rotor with a rotatable hub having at least rotor blade, and a system for controlling the wind turbine as described herein configured as a component of the wind turbine. The system for controlling the wind turbine may be configured in accordance with any one of the embodiments set forth above.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for controlling a wind turbine. More specifically, one or more sensors may be used to detect a loading condition acting on a wind turbine. For example, in several embodiments, one or more Micro Inertial Measurement Units (MIMU) sensors may be used to detect the loading condition, such as a load acting on one of or a combination of a rotor blade, a rotor, a hub, a nacelle, a main shaft, a generator, a tower, or any other component of the wind turbine. The loading condition(s) is used to determine a first scaler factor. The sensors may also be configured to measure a plurality of operating conditions of the wind turbine. As such, a correction parameter may be determined as a function of at least two operating conditions and is representative of a real-time operational state of the wind turbine. The operating conditions may be any one of or combination of the following: a pitch angle, a generator torque, a generator speed, power output, or similar. For example, in one embodiment, the at least two operating conditions may be a function of a pitch angle and a power output. In a further embodiment, the operating conditions may also include any loading experienced by the wind turbine components and/or any dynamic response. As described herein, a "dynamic response" may include any wind turbine component displacement, acceleration, velocity, thrust, loading, or similar, wind speed, or any derivatives thereof.

The correction parameter is then used to determine a second scaler factor. Based on the first scaler factor and the second scaler factor, an adjustment set point is determined and used to control the wind turbine. For example, the wind turbine may be controlled by performing a corrective action, such as de-rating or up-rating the wind turbine. In further embodiments, de-rating or up-rating the wind turbine may include altering a pitch angle of a rotor blade, modifying a generator torque, modifying a generator speed, modifying a power output, yawing a nacelle of the wind turbine, braking various wind turbine components, activating airflow modifying features on any of the rotor blades (i.e. spoilers, flaps, etc.), or any combination thereof. Further, it should be understood that de-rating or up-rating the wind turbine is not limited to the aforementioned list, but may include any appropriate correction action known in the art.

Due to the correction parameter, however, the de-rating or up-rating of the wind turbine is curtailed such that power output is maximized (and even increased above rated power), but where design loads are not exceeded. For example, in some instances, a high turbulence wind gust may cause a measured loading condition to be very high. In this example, conventional systems implement a standard de-rate of the wind turbine (as described in FIGS. 1-2). The current system and method described herein, however, incorporate the measured loading condition(s) (first scaler factor) and the correction parameter (second scaler factor) to identify the real-time operational state of the wind turbine. As such, the de-rated power curve may be curtailed (i.e. increased) while also maintaining loads under design standards.

Figure 3:
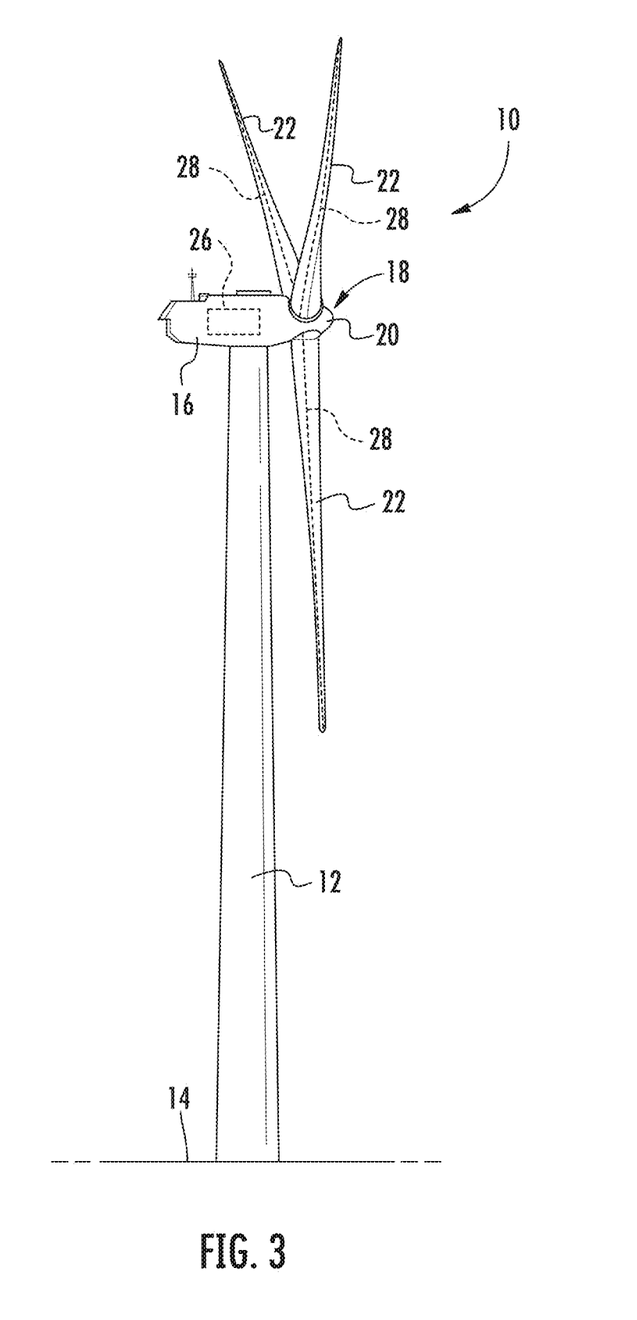
FIG. 3 illustrates a perspective view of one embodiment of a wind turbine.

Referring now to the drawings, FIG. 3 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 4) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or components of the wind turbine 10 and will be discussed in more detail below.

Figure 4:
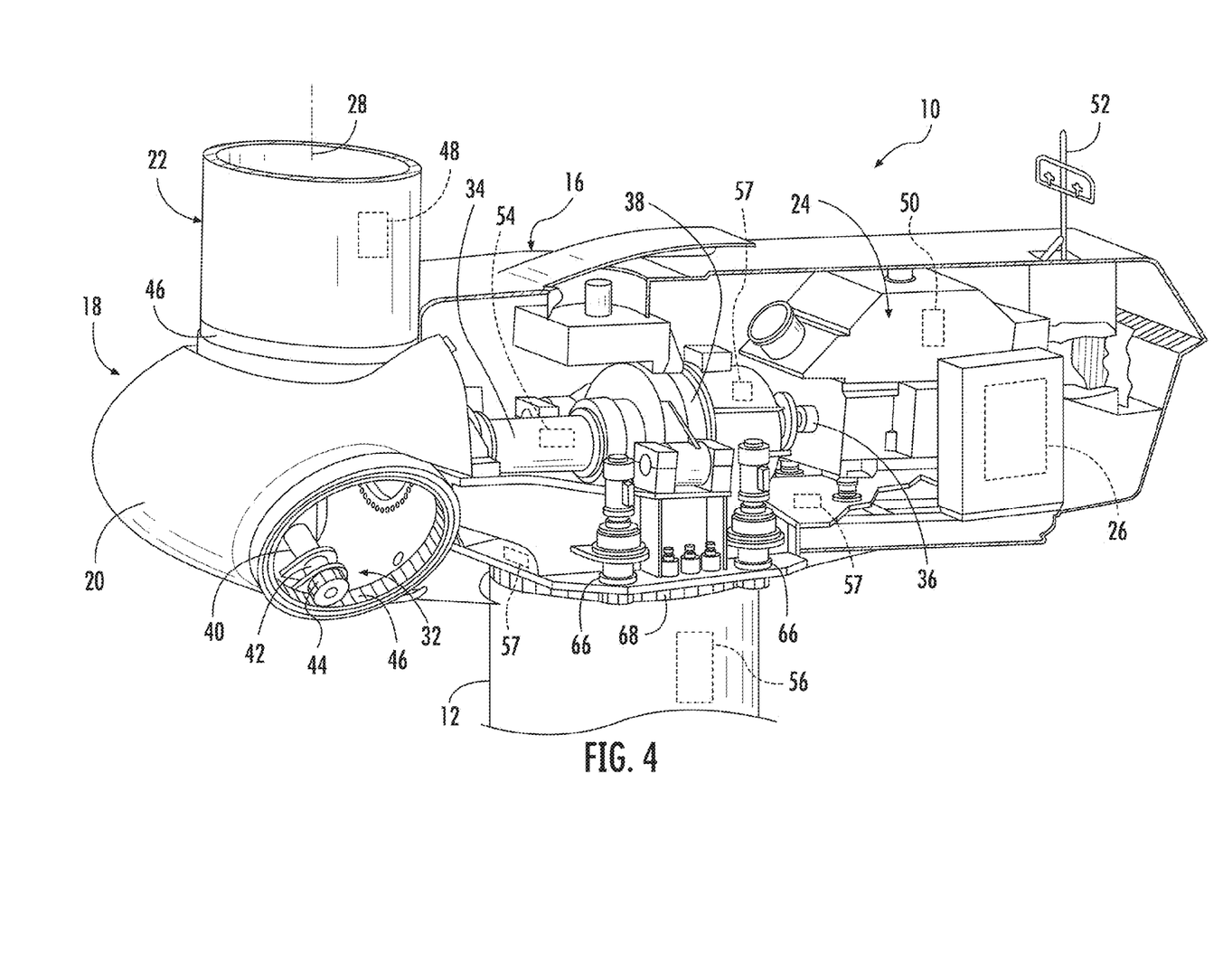
FIG. 4 illustrates a simplified, internal view of one embodiment of a nacelle of a wind turbine.

Referring now to FIG. 4, a simplified, internal view of one embodiment of the nacelle 16 of the wind turbine 10 shown in FIG. 3 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

In addition, the wind turbine 10 may also include one or more sensors 48, 50, 52, 54, 56, 57 for monitoring various loading conditions and/or operating conditions of the wind turbine 10. As used herein, the term "loading condition" may refer to any suitable loading condition and/or parameter that relates to a load acting on the wind turbine 10. For instance, loading conditions may include, but are not limited to, any load or moment acting on one of or a combination of the rotor blades 22, the rotor 18, the hub 20, the nacelle 16, the main shaft 34, the generator 24, the tower 12 or other similar component of the wind turbine 10. Further, the term "operating condition" as used herein may refer to any suitable operating condition and/or parameter that relates to operation of the wind turbine 10 so as to provide information regarding the current or real-time operational state of the wind turbine. For instance, operating conditions may include, but are not limited to, a pitch angle, a generator torque, a generator speed, a power output, or similar. In addition, the loading and/or operating conditions may also include derivatives of any monitored loading and/or operating conditions (e.g., blade velocity, acceleration, etc.).

Still referring to FIG. 4, the one or more sensors may include blade sensors 48 for monitoring the rotor blades 22; generator sensors 50 for monitoring the torque, the rotational speed, the acceleration and/or the power output of the generator 24; wind sensors 52 for monitoring the wind speed; and/or shaft sensors 54 for measuring the loads acting on the rotor shaft 34 and/or the rotational speed of the rotor shaft 34. Additionally, the wind turbine 10 may include one or more tower sensors 56 for measuring the loads transmitted through the tower 12 and/or the acceleration of the tower 12. Of course, the wind turbine 10 may further include various other suitable sensors for measuring any other suitable loading and/or operating conditions of the wind turbine 10. For example, the wind turbine 10 may also include one or more sensors 57 (e.g., accelerometers) for monitoring the acceleration of the gearbox 38 and/or the acceleration of one or more structural components of the machine head (e.g., the generator frame, the main frame or bedplate, etc.).

In several embodiments, each sensor may be a Micro Inertial Measurement Unit (MIMU). As is generally understood, MIMUs may include any combination of three-dimensional (3-D) accelerometers, 3-D gyroscopes and 3-D magnetometers and thus, when mounted on and/or within a rotor blade 22, may be capable of providing various types of blade-related measurements, such as 3-D blade orientation (pitch, roll, yaw) measurements, 3D blade acceleration measurements, 3-D rate of turn measurements, 3D magnetic field measurements and/or the like. As will be described below, such measurements may then be transmitted to the controller 26 and subsequently analyzed to determine real-time values for one or more of the loading and/or operating conditions. In alternative embodiments, the sensors may be any other suitable sensors capable of monitoring the loading and/or operating conditions of the wind turbine 10. For example, the sensors may be strain gauges, accelerometers, pressure sensors, angle of attack sensors, vibration sensors, LIDAR sensors, camera systems, fiber optic systems, other optical sensors and/or any other suitable sensors.

It should be appreciated that, as used herein, the term "monitor" and variations thereof indicates that the various sensors of the wind turbine may be configured to provide a direct measurement of the parameters being monitored or an indirect measurement of such parameters. Thus, the sensors may, for example, be used to generate signals relating to the condition being monitored, which can then be utilized by the controller 26 to determine the actual condition. For instance, as indicated above, MIMU sensors may be used to monitor one or more loading and/or operating conditions by providing various 3-D measurements, which may then be correlated to the loading and/or operating condition(s).

Figure 5:
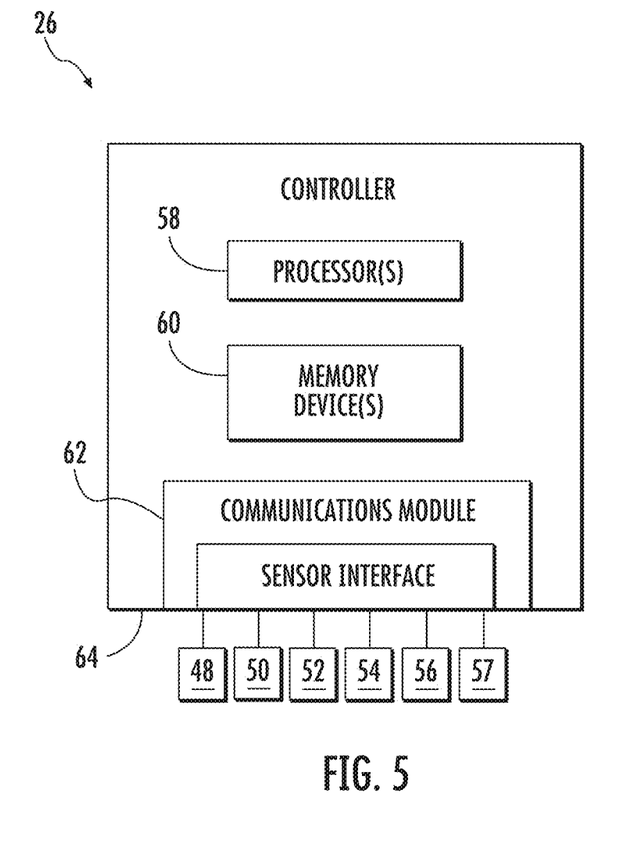
FIG. 5 illustrates a schematic diagram of one embodiment of a system for controlling a wind turbine according to the present disclosure.

Referring now to FIG. 5, there is illustrated a block diagram of one embodiment of suitable components that may be included within the controller 26 in accordance with aspects of the present subject matter. As shown, the controller 26 may include one or more processor(s) 58 and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50, 52, 54, 56, 57 (such as loading and/or operating conditions) to be converted into signals that can be understood and processed by the processors 58. It should be appreciated that the sensors 48, 50, 52, 54, 56, 57 may be communicatively coupled to the communications module 62 using any suitable means. For example, as shown in FIG. 5, the sensors 48, 50, 52, 54, 56, 57 are coupled to the sensor interface 64 via a wired connection. However, in other embodiments, the sensors 48, 50, 52, 54, 56, 57 may be coupled to the sensor interface 64 via a wireless connection, such as by using any suitable wireless communications protocol known in the art.

The processor 58 may be configured to determine a first scaler factor based on the one or more stored loading conditions. For example, in one embodiment, the processor calculates a standard deviation, an arithmetic mean, a weighted average, a lag filter, or similar based on the stored loading conditions. It should be understood that the processor is not limited to these calculations, but may include any suitable calculation to determine the first scaler factor. The standard deviation as described here indicates how much variation or dispersion exists from an average (mean), or expected value. The arithmetic mean (or simply the mean or average) as described herein is the sum of a collection of numbers divided by the number of numbers in the collection. The weighted average as described herein is similar to an arithmetic mean, where instead of each of the data points contributing equally to the final average, some data points contribute more than others. A lag filter, or lead-lag compensator, may be a component in the processor 58 that improves an undesirable frequency response in the processor 58.

The processor 58 then determines a first scaler factor based on the calculation. More specifically, the processor may include a look-up table (LUT) of standard deviations, weighted averages, lag filters, or similar with corresponding first scaler factors. The LUT may reside in hardware or software. As such, in one embodiment, the first scaler factor may correspond to a first generator torque scaler factor or a first generator speed scaler factor in the LUT. In further embodiments, more than one first scaler factors may be determined, such as a first generator speed scaler factor and a first generator torque scaler factor. In still further embodiments, the processor may include a set of equations or functions to determine the first scaler factors. It should be further understood that the processor may use any suitable means known in the art and is not limited by the methods described herein.

Further, the processor may determine a correction parameter as a function of at least two measured operating conditions. As such, the correction parameter is representative of the real-time operational state of the wind turbine. More specifically, the sensors may monitor a plurality of operating conditions of the wind turbine and then store the conditions in the memory device. The correction parameter may then be calculated as a function of at least two of the operating conditions. For example, the correction parameter may be calculated as a function of the pitch angle of a rotor blade and the power output of the wind turbine. In further embodiments, the at least two operating conditions of the wind turbine may include any one of or a combination of a pitch angle, a generator torque, a generator speed, or a power output. In still further embodiments, the operating conditions may also include any loading experienced by the wind turbine components and/or any dynamic response. Examples of such dynamic responses include any wind turbine component displacement, acceleration, velocity, thrust, loading, or similar, wind speed, or any derivatives thereof.

In further embodiments, a plurality of correction parameters may be calculated based on the operating conditions. As such, the plurality of correction parameters may be stored in the memory device. The processor 58 may then calculate a weighted average of the plurality of correction parameters. More specifically, the processor 58 may calculate an exponential weighted moving average (EWMA) of the stored correction parameters. Further, the processor 58 may include a LUT of weighted averages and corresponding second scaler factors. As such, the processor 58 determines a second scaler factor based on the weighted average of the plurality of correction parameters from the LUT.

In one embodiment, the second scaler factor may correspond to a second generator torque scaler factor or a second generator speed scaler factor. In further embodiments, more than one second scaler factors may be determined, such as a second generator speed scaler and a second generator torque scaler. In still further embodiments, the processor may include a set of equations or functions to determine the first scaler factors. It should be further understood that the processor may use any suitable means known in the art and is not limited by the methods described herein. The processor 58 may then determine an adjustment set point based on the first scaler factor and the second scaler factor, for example, by multiplying the two set point scalers together.

The controller 26 may be communicatively coupled to the processor 58 such that it controls the wind turbine by performed a corrective action based on the adjustment set point. As such, the wind turbine 10 may be controlled such that power output is increased without exceeding design loads. In several embodiments, the corrective action may include temporarily de-rating the wind turbine to permit the loads acting on or more of the wind turbine components to be reduced or otherwise controlled, which may include speed de-rating, torque de-rating or a combination of both. In another embodiment, the wind turbine 10 may be de-rated by pitching one or more of the rotor blades 22 about its pitch axis 28. More specifically, the controller 26 may generally control each pitch adjustment mechanism 32 in order to alter the pitch angle of each rotor blade 22 between 0 degrees (i.e., a power position of the rotor blade 22) and 90 degrees (i.e., a feathered position of the rotor blade 22). In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24. The wind turbine 10 may also be temporarily de-rated by yawing the nacelle 16 to change the angle of the nacelle 16 relative to the direction of the wind. In other embodiments, the controller 26 may be configured to actuate one or more mechanical brake(s) in order to reduce the rotational speed of the rotor blades 22, thereby reducing component loading. In still further embodiments, the controller 26 may be configured to activate one or more airflow modifying elements on one or more of the rotor blades. For example, the controller 26 may activate one or more spoilers or flaps on the surface of one or more of the rotor blades. Additionally, the controller 26 may be configured to any appropriate corrective action known in the art. In even further embodiments, the loads on the wind turbine components may be reduced by performing a combination of two or more corrective actions, such as by altering the pitch angle of one or more of the rotor blades 22 together with modifying the torque demand on the generator 24. Additionally, the corrective action may include up-rating the wind turbine in the instance wherein the corrected set point determines that the loading condition is under design standards and the wind turbine is producing low power.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more operating parameters of the wind turbine 10 based on sensor measurements, transmitting suitable control signals to implement corrective actions in response to the detection of transient wind conditions and various other suitable computer-implemented functions.

Figure 6:
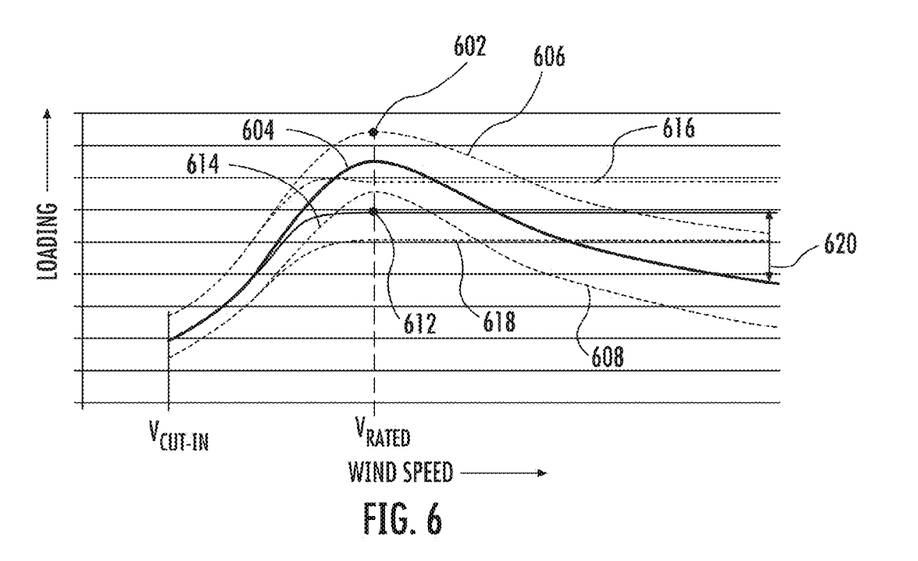
FIG. 6 illustrates a plurality of loading curves of a wind turbine as a function of wind speed according to the present disclosure; and, FIG. 7 illustrates a graph having multiple power curves acting on a wind turbine as a function of wind speed according to the present disclosure; and, FIG. 8 illustrates a flow diagram of one embodiment of a method for controlling a wind turbine according to the present disclosure.
Figure 7:
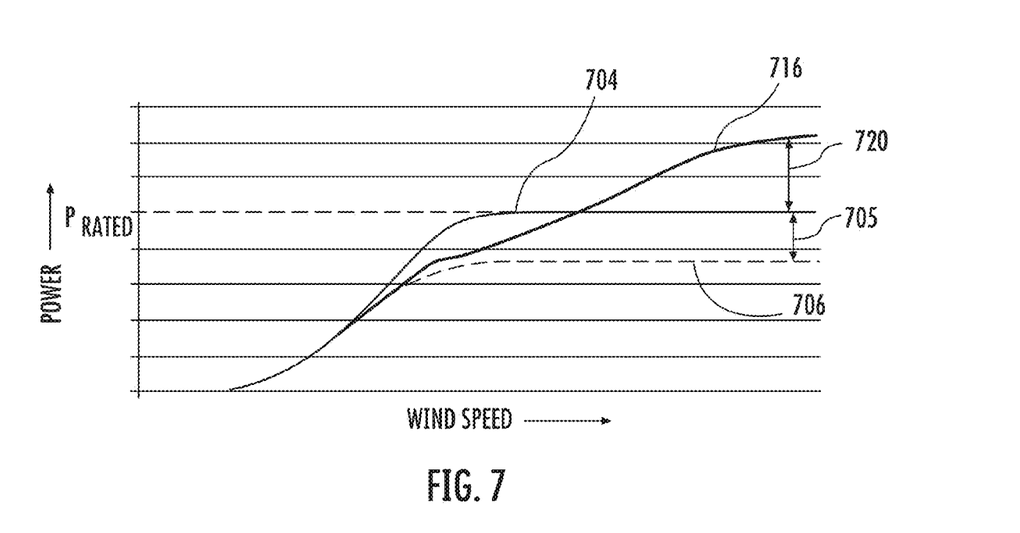

As mentioned, the system and method described herein may be utilized to control a wind turbine by curtailing a de-rated power curve to maximize power without exceeding design loads for individual wind turbine components. Additionally, the system and method according to the present disclosure may be better understood with reference to FIGS. 6 and 7. FIG. 6 illustrates various mechanical loads experienced by the wind turbine as a function of wind speed. FIG. 7 illustrates corresponding power curves as a function of wind speed. Curve 604 represents the loads acting on a wind turbine component where the control system has not been activated. Curve 704 is the corresponding power curve. Curve 614 illustrates the loads acting on a wind turbine component where the rated power has been de-rated using the system and method of the present disclosure. Curve 716 is the corresponding power curve. The graph also illustrates the differential threshold (as indicated by the dotted curves 606, 608 and curves 616, 618) as a predetermined +/− variation from the predicted loading values 604, 614, respectively. As shown in regards to curves 604, 614, the loads acting on the wind turbine component increase from $V_{cut-in}$ to $V_{rated}$ and then decrease thereafter as the wind speed increases because power may be more efficiently produced at higher wind speeds. Point 602 represents a maximum load experienced by a wind turbine component during full operation. Point 612 represents the de-rated maximum load.

Of particular importance in regards to the present disclosure is what happens to the de-rated power curve and loading curve after $V_{rated}$. As discussed in regards to FIG. 1, conventional systems de-rate the rated power such that the maximum loading point 602 decreases, however, power is also decreased in response, as indicated by curve 706. FIGS. 6 and 7, however, show the advantage of the system and method disclosed herein; wherein the de-rated power curve 716 is curtailed to increase up to and above the rated power curve 704, but where the corresponding loading 614 remains less than design loads. More specifically, de-rated loading curve 614 increases above the normal loading curve 604 (differential 620) when the de-rated power curve 716 is curtailed; however, the loads still remain below design loads (point 602). The increase in power production is represented by differential 720 (FIG. 7). More specifically, as shown, the system and method described herein not only decreases the loss of power caused by the de-rate (gap 705), but can increase power above $P_{rated}$ (as indicated by gap 720).

Figure 8:
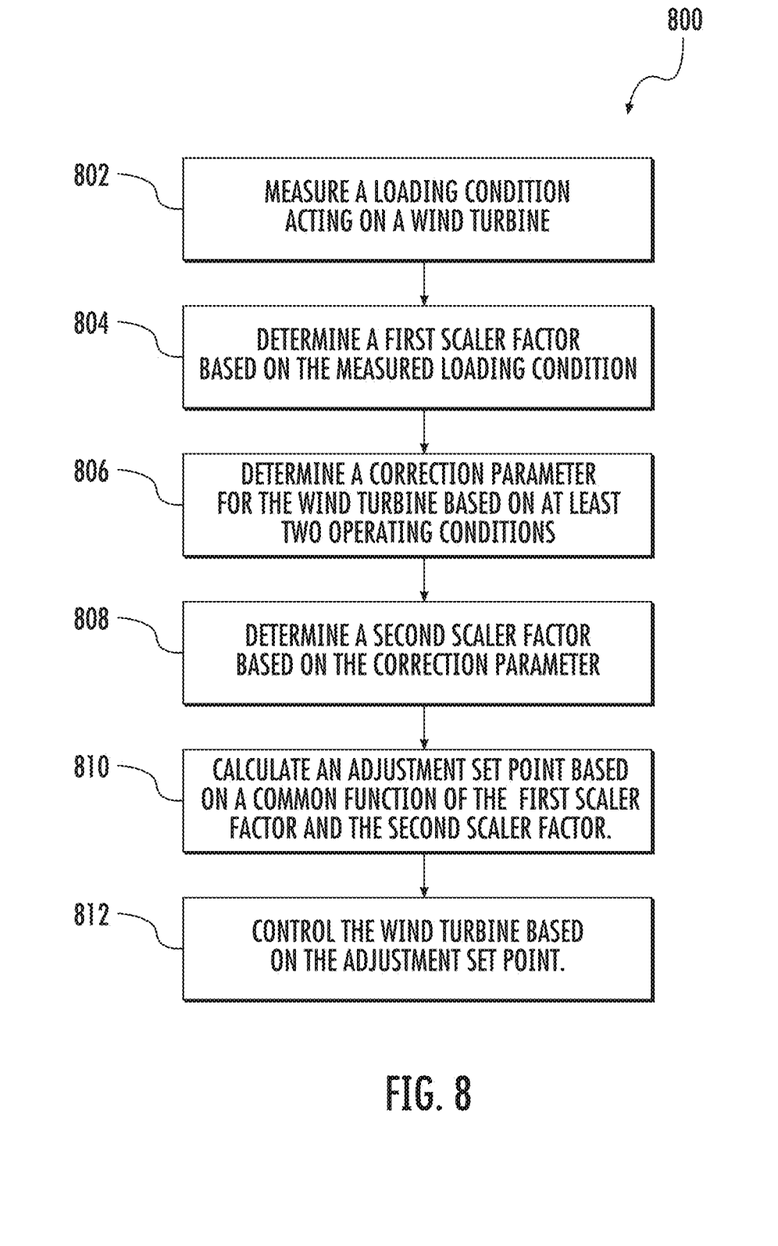

Referring now to FIG. 8, a flow diagram of one embodiment of a method 800 for controlling a wind turbine is illustrated in accordance with aspects of the present subject matter. As shown, the method 800 may include measuring a loading condition acting on a wind turbine 802, determining a first scaler factor based on the loading condition 804, determining a correction parameter as a function of at least two operating conditions 806, determining a second scaler factor based on the correction parameter 808, calculating an adjustment set point based on the first scaler factor and the second scaler factor 810, and, controlling the wind turbine based on the adjustment set point 812. The method may further include any of the steps described herein for controlling a wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine, the method comprising:
    measuring a loading condition acting on the wind turbine;
    determining a first scaler factor based on the measured loading condition;
    determining a correction parameter for the wind turbine, the correction parameter a function of at least two measured operating conditions and representative of a real-time operational state of the wind turbine;
    determining a second scaler factor based on the correction parameter;
    calculating an adjustment set point for the wind turbine by multiplying the first scaler factor by the second scaler factor; and,
    controlling the wind turbine based on the adjustment set point.

2. The method as in claim 1, wherein measuring a loading condition acting on the wind turbine comprises the use of one or more sensors, wherein the one or more sensors comprise one of or a combination of a MIMU sensor, a strain gauge, an accelerometer, a proximity sensor, a pressure sensor, an angle of attack sensor, a vibration sensor, a LIDAR sensor, a camera system, or a fiber optic system.

3. The method as in claim 1, wherein the loading condition reflects a loading acting on one of or a combination of a rotor blade, a rotor, a hub, a bed plate, a main frame, a generator frame, a pitch bearing, a yaw bearing, a gearbox, a nacelle, a main shaft, a generator, or a tower of the wind turbine.

4. The method as in claim 1, Wherein determining the first scaler factor further comprises:
    storing a plurality of loading conditions over a period of time;
    calculating one of a standard deviation, a weighted average, or a lag filter of the plurality of loading conditions; and,
    determining the first scaler factor based on the calculation.

5. The method as in claim 1, wherein determining the correction parameter further comprises:
    measuring a plurality of operating conditions of the wind turbine;
    storing the plurality of operating conditions;
    calculating a plurality of correction parameters as a function of at least two of the stored operating conditions;
    calculating a weighted average of the plurality of correction parameters; and,
    determining a final correction parameter based on the weighted average of the plurality of correction parameters.

6. The method as in claim 1, wherein one of the at least two operational conditions of the wind turbine comprise a pitch angle.

7. The method as in claim 6, wherein the at least two operational conditions of the wind turbine comprise one of a generator torque, a generator speed, or a power output.

8. The method as in claim 1, further comprising adjusting the adjustment set point by a safety factor.

9. The method as in claim 1, wherein controlling the wind turbine further comprises:
    performing a corrective action, wherein the corrective action comprises one of de-rating the wind turbine or up-rating the wind turbine, wherein de-rating the wind turbine or up-rating the wind turbine comprises at least one of altering a pitch angle of a rotor blade, modifying a generator torque, modifying a generator speed, modifying a power output, yawing a nacelle of the wind turbine, braking one or more wind turbine components, or activating an airflow modifying element on a rotor blade.

10. A system for controlling a wind turbine, the system comprising:
    one or more sensors configured to monitor one or more loading conditions acting on the wind turbine;
    a processor communicatively coupled to the one or more sensors, the processor configured to:

determine a first scaler factor based on the one or more loading conditions;

determine an correction parameter, wherein the correction parameter is a function of at least two measured operating conditions of the wind turbine and is representative of a real-time operational state of the wind turbine;

calculate a second scaler factor based on the correction parameter;

determine an adjustment set point for the wind turbine by multiplying the first scaler factor by the second scaler factor; and, a controller communicatively coupled to the processor, wherein the controller controls the wind turbine based on the adjustment set point.

11. The system as in claim 10, wherein the one or more sensors comprise one of or a combination of a MIMU sensor, a strain gauge, an accelerometer, a proximity sensor, a pressure sensor, an angle of attack sensor, a vibration sensor, a LIDAR sensor, a camera system, or a fiber optic system.

12. The system as in claim 10, wherein the loading condition reflects a loading acting on one of or a combination of a rotor blade, a rotor, a hub, a bed plate, a main frame, a generator frame, a pitch bearing, a yaw bearing, a gearbox, a nacelle, a main shaft, a generator, or a tower of the wind turbine.

13. The system as in claim 10, further comprising a memory device, wherein the memory device is configured to:

store a plurality of loading conditions; and, store a plurality of measured operating conditions.

14. The system as in claim 13, wherein the processor is further configured to:

calculate one of a standard deviation, a weighted average, or a lag filter of the plurality of stored loading conditions; and, determine the adjustment set point based on the calculation.

15. The system as in claim 13, wherein the processor is further configured to:

calculate a plurality of correction parameters as a function of at least two of the stored operating conditions;

calculate a weighted average of the plurality of correction parameters; and, determine a final correction parameter based on the weighted average of the plurality of correction parameters.

16. The system as in claim 10, wherein the at least two operational conditions of the wind turbine comprise at least one of a pitch angle, a generator torque, a generator speed, or a power output.

17. The system as in claim 10, wherein the controller is further configured to perform a corrective action on the wind turbine based on the corrected set point, wherein the corrective action comprises one of de-rating the wind turbine or up-rating the wind turbine, and wherein de-rating or up-rating the wind turbine comprises at least one of altering a pitch angle of a rotor blade, modifying a generator torque, modifying a generator speed, modifying a power output, or yawing a nacelle of the wind turbine.

18. A method for optimizing a power output of a wind turbine under changing loading conditions, the method comprising:

measuring at least one loading condition acting on the wind turbine;

determining a first scaler factor based on the measured loading condition;

monitoring a power output of the wind turbine;

modifying at least one operating condition of the wind turbine so as to keep the loading condition under a design load;

determining a second scaler factor based on the operating condition;

calculating an adjustment set point for the wind turbine by multiplying the first scaler factor by the second scaler factor; and, incrementally increasing the power output of the wind turbine based on the adjustment set point so long as the loading condition is less than the design load.

19. The method of claim 18, wherein the operating condition of the wind turbine comprises at least one of a pitch angle, a generator torque, a generator speed, or a power output.

* * * * *